United States Patent
Cho

(10) Patent No.: US 12,542,963 B2
(45) Date of Patent: Feb. 3, 2026

(54) ELECTRONIC DEVICE INCLUDING SUPPORTING STRUCTURE FOR COMPONENT

(71) Applicant: SAMSUNG ELECTRONICS CO., LTD., Suwon-si (KR)

(72) Inventor: Chaeyang Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 176 days.

(21) Appl. No.: 18/106,703

(22) Filed: Feb. 7, 2023

(65) Prior Publication Data

US 2023/0254565 A1    Aug. 10, 2023

Related U.S. Application Data

(63) Continuation of application No. PCT/KR2023/001752, filed on Feb. 7, 2023.

(30) Foreign Application Priority Data

Feb. 7, 2022  (KR) .................. 10-2022-0015722
Mar. 29, 2022  (KR) .................. 10-2022-0038638

(51) Int. Cl.
*H04N 23/57*  (2023.01)
*G03B 30/00*  (2021.01)
(Continued)

(52) U.S. Cl.
CPC ............. *H04N 23/57* (2023.01); *G03B 30/00* (2021.01); *H04M 1/0264* (2013.01);
(Continued)

(58) Field of Classification Search
CPC ........ H04N 23/50; H04N 23/51; H04N 23/54; H04N 23/55; H04N 23/57; G03B 30/00;
(Continued)

(56) References Cited

U.S. PATENT DOCUMENTS

2015/0185587 A1    7/2015  Kim
2015/0198864 A1    7/2015  Havskjold et al.
(Continued)

FOREIGN PATENT DOCUMENTS

CN    103312840    9/2013
CN    107707796    2/2018
(Continued)

OTHER PUBLICATIONS

Search Report and Written Opinion dated May 16, 2023 issued in International Patent Application No. PCT/KR2023/001752.

*Primary Examiner* — Twyler L Haskins
*Assistant Examiner* — Akshay Trehan
(74) *Attorney, Agent, or Firm* — Nixon & Vanderhye P.C.

(57) ABSTRACT

According to various embodiments of the disclosure, there may be provided an electronic device comprising: a printed circuit board; at least one component electrically connected with the printed circuit board; a housing accommodating the printed circuit board and the at least one component; and a supporting structure including an extension extending toward an interfacing area of the at least one component configured to support at least a portion of the at least one component.

16 Claims, 15 Drawing Sheets

(51) Int. Cl.
*H04M 1/02* (2006.01)
*H04N 23/51* (2023.01)
*H04N 23/54* (2023.01)
*H04N 23/55* (2023.01)

(52) U.S. Cl.
CPC ............. *H04N 23/51* (2023.01); *H04N 23/54* (2023.01); *H04N 23/55* (2023.01); *H04M 1/0277* (2013.01)

(58) Field of Classification Search
CPC ................ G03B 17/02; G03B 2217/00; G03B 2217/002; G02B 7/003; G02B 7/004; G02B 7/02; G02B 7/025; H04M 1/0264; H04M 1/0277; H04M 1/0283; H05K 1/14; H05K 1/147; H05K 2201/10121
See application file for complete search history.

(56) References Cited

U.S. PATENT DOCUMENTS

| | | | |
|---|---|---|---|
| 2019/0208128 A1 | 7/2019 | Park et al. | |
| 2020/0204665 A1 | 6/2020 | Cheng | |
| 2020/0322467 A1* | 10/2020 | Huh | ...................... G06F 1/1658 |
| 2021/0120150 A1 | 4/2021 | Moon | |
| 2021/0227060 A1 | 7/2021 | Jin et al. | |

FOREIGN PATENT DOCUMENTS

| | | | |
|---|---|---|---|
| CN | 112437179 | 3/2021 | |
| CN | 112672019 | 4/2021 | |
| CN | 213028286 | 4/2021 | |
| CN | 213028286 U * | 4/2021 | ............... G06F 1/16 |
| KR | 10-2000-0014797 | 3/2000 | |
| KR | 10-2015-0009697 | 1/2015 | |
| KR | 10-2020-0055728 | 5/2020 | |
| KR | 10-2020-0117553 | 10/2020 | |
| KR | 10-2021-0046256 | 4/2021 | |

\* cited by examiner

ELECTRONIC DEVICE INCLUDING SUPPORTING STRUCTURE FOR COMPONENT

CROSS-REFERENCE TO RELATED APPLICATIONS

This application is a continuation of International Application No. PCT/KR2023/001752 designating the United States, filed on Feb. 7, 2023, in the Korean Intellectual Property Receiving Office and claiming priority to Korean Patent Application No. 10-2022-0015722, filed on Feb. 7, 2022, in the Korean Intellectual Property Office, and to Korean Patent Application No. 10-2022-0038638, filed on Mar. 29, 2022, in the Korean Intellectual Property Office, the disclosures of all of which are incorporated by reference herein in their entireties.

FIELD

Background

The disclosure relates to an electronic device including a component, e.g., an electronic device including at least one camera module.

Description of Related Art

The growth of electronics, information, and communication technologies leads to integration of various functions into a single electronic device. For example, smartphones may include the functionalities of a sound player, imaging device, and scheduler, as well as the communication functionality and may provide more various functions by additionally installing applications. An electronic device may not only its equipped applications or stored files but also access, wiredly or wirelessly, a server or another electronic device to receive, in real-time, various pieces of information.

As various functions are implemented in one electronic device (e.g., a smartphone), sound players or video players or image capturing devices are being replaced with smartphones. As small electronic devices may have limited optical performance, the quality of captured images or videos may be enhanced by implementing a capturing function using a plurality of cameras or image sensors. Recently, electronic devices equipped with a high-performance camera module are expected to take a significant market share in the high-end camera market, such as compact camera market, such as of single-lens reflex cameras.

The alignment of the camera module (e.g., lens(es) or barrel) with the optical hole or camera window where light is incident not only affects the performance of the camera module but also deteriorates the appearance of the electronic device if not properly made. To reduce this, a method for supporting and aligning the camera module by another structure (e.g., a supporting member) may be devised. According to an embodiment, when a plurality of cameras are included, some cameras may be formed in an inclined state with respect to the camera window during a manufacturing process. Accordingly, given a predetermined tolerance, a supporting member capable of supporting the inclined camera structure may be provided.

However, even with the supporting member as described above, other issues, such as an increase in the repulsive force of other components (e.g., flexible printed circuit boards) supporting the camera module may cause an excessive degree of eccentricity relative to the window or lift of the camera module without enhancing the inclined state of the camera. A conventional way to avoid such issues is to provide a separate member, such as a fixing tape, for fixing the camera module.

SUMMARY

Embodiments of the disclosure address the foregoing issues and/or drawbacks and provide advantages described below, providing an electronic device in which it is easy to align the optical hole, camera window, and/or the camera module.

Other aspects according to various example embodiments will be suggested through in the following detailed description and would be apparent from the description or appreciated through the example embodiments.

According to an embodiment of the disclosure, there may be provided an electronic device comprising: a printed circuit board; at least one component electrically connected with the printed circuit board; a housing accommodating the printed circuit board and the at least one component; and a supporting structure including an extension extending toward an interfacing area of the at least one component configured to support at least a portion of the at least one component.

According to an embodiment of the disclosure, there may be provided an electronic device including a camera module, comprising: a printed circuit board; a camera module including a lens assembly and a camera housing surrounding at least a portion of the lens assembly and electrically connected with the printed circuit board; a housing accommodating the printed circuit board and the camera module and formed therein a sensing area of the camera module; and a supporting structure including an extension extending toward the sensing area of the camera module configured to support at least a portion of the camera housing.

According to an embodiment of the disclosure, it is possible to prevent and/or reduce a component (e.g., camera module) from lifting and resultantly tilting even without including a separate member, e.g., a fixing tape. It is also possible to prevent and/or reduce an inclination from being made relative to the surface (or camera window) of the housing. For example, the camera module may be easily aligned with the optical hole or camera window even without using a separate member. As the camera module is well aligned with the optical hole, it is possible to suppress or prevent degradation of the optical performance and poor appearance of the electronic device due to an eccentric alignment. the camera module according to an embodiment is substantially fixed inside the electronic device by the elastic force of an elastic member. Thus, manufacture and reassembly of the camera module may be easier than by an attaching method. For example, it may be easy to repair/replace to correct the assembly error in the camera module according to various embodiments. Other various effects may be provided directly or indirectly in the disclosure.

BRIEF DESCRIPTION OF THE DRAWINGS

The foregoing and other aspects, features, and/or advantages of various embodiments of the disclosure will be more apparent from the following detailed description, taken in conjunction with the accompanying drawings, in which.

Throughout the drawings, like reference numerals may be assigned to like parts, components, and/or structures.

DETAILED DESCRIPTION

The following description taken in conjunction with the accompanying drawings may be presented to provide a comprehensive understanding of various implementations of the disclosure as defined by the claims and equivalents thereto. The specific embodiments disclosed in the following description entail various specific details to aid understanding, but are regarded as one of various embodiments. Accordingly, it will be apparent to those skilled in the art that various changes and modifications may be made to the various implementations described in the disclosure without departing from the scope and spirit of the disclosure. Further, descriptions of well-known functions and configurations may be omitted for clarity and brevity.

The terms and words used in the following description and claims are not limited to the bibliographical meaning, but may be used to clearly and consistently describe the various embodiments of the disclosure. Therefore, it will be apparent to those skilled in the art that the following description of various example implementations of the disclosure is provided for the purpose of description, not for the purpose of limiting the disclosure defined as the scope of the claims and equivalent thereto.

The singular forms "a," "an," and "the" are intended to include the plural forms as well, unless the context clearly indicates otherwise. Thus, as an example, "a component surface" may be interpreted as including one or more of the surfaces of a component.

Figure 1:
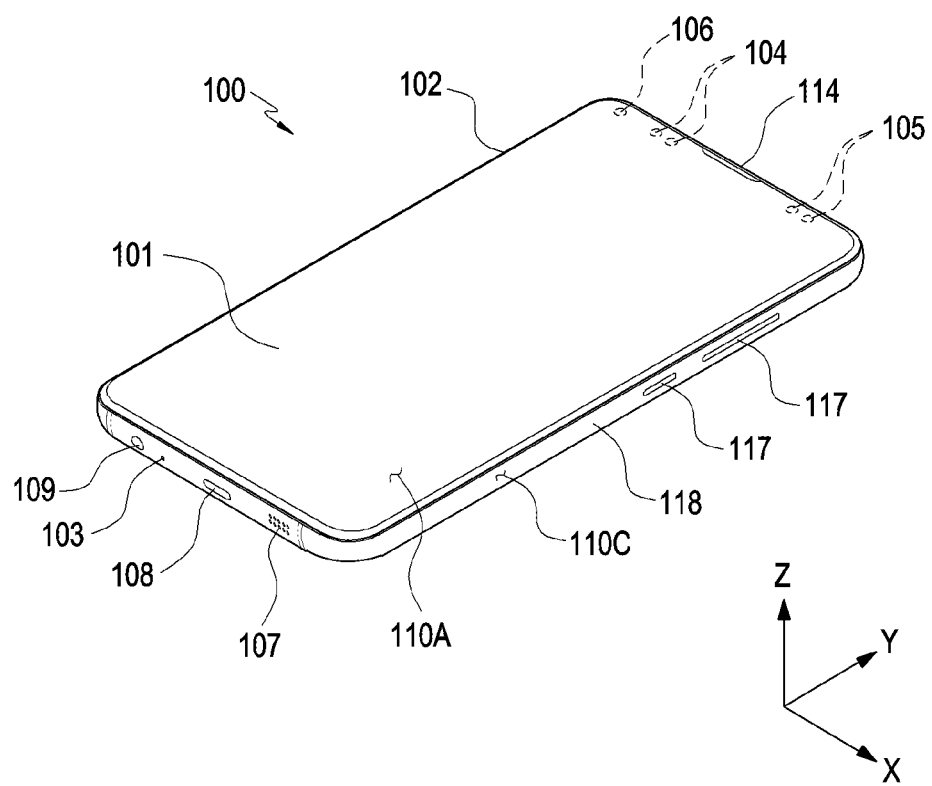
FIG. 1 is a front perspective view illustrating an electronic device according to an embodiment.
Figure 2:
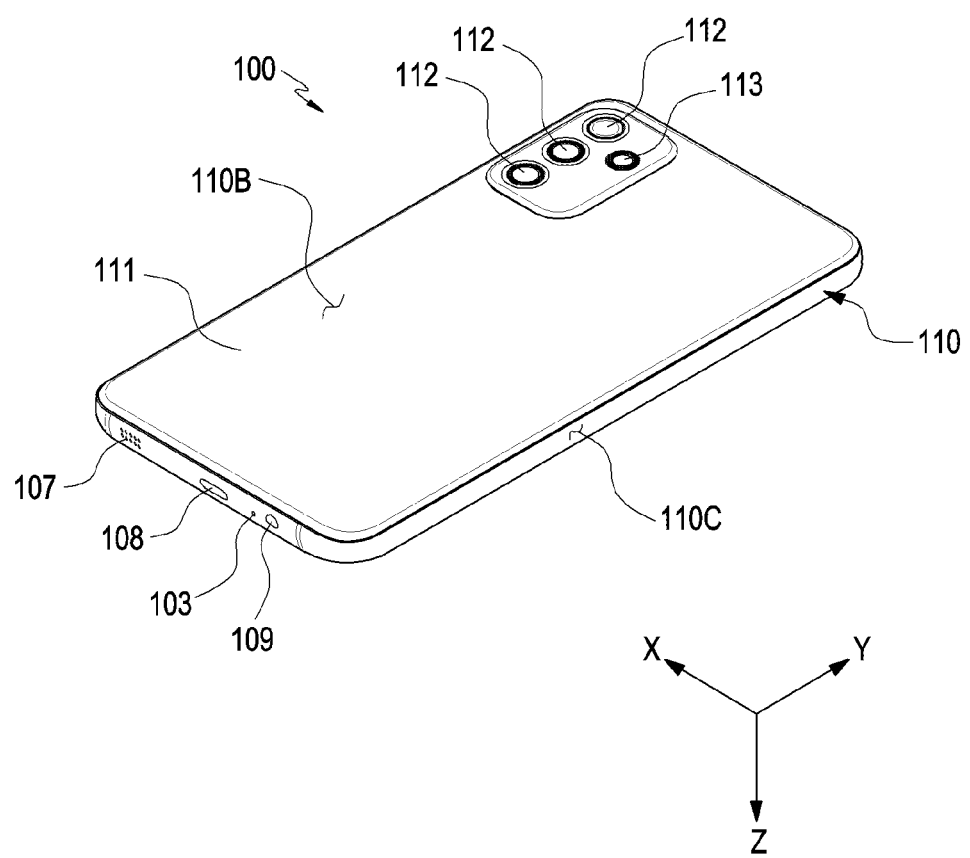
FIG. 2 is a rear perspective view illustrating the electronic device of FIG. 1 according to an embodiment.

FIG. 1 is a front perspective view illustrating an electronic device according to various embodiments. FIG. 2 is a rear perspective view illustrating the electronic device of FIG. 1 according to an embodiment.

Referring to FIGS. 1 and 2, the electronic device 100 according to an embodiment may include a housing 110 including a first surface (or front surface) 110A, a second surface (or rear surface) 110B, and a side surface 110C surrounding a space the first surface 110A and the second surface 110B. According to an embodiment (not shown), the housing 110 may denote a structure forming the first surface 110A of FIG. 1, the second surface 110B of FIG. 2, and some of the side surfaces 110C. According to an embodiment, at least part of the first surface 110A may have a substantially transparent front plate 102 (e.g., a glass plate or polymer plate including various coat layers). The second surface 110B may be formed by a rear plate 111 that is substantially opaque. The rear plate 111 may be formed of, e.g., laminated or colored glass, ceramic, polymer, metal (e.g., aluminum, stainless steel (STS), or magnesium), or a combination of at least two thereof. The side surface 110C may be formed by a side structure (or a "side structure") 118 that couples to the front plate 102 and the rear plate 111 and includes a metal and/or polymer. According to an embodiment, the rear plate 111 and the side structure 118 may be integrally formed together and include the same material (e.g., a metal, such as aluminum).

Although not shown, the front plate 102 may include area(s) that bend from at least a portion of an edge toward the rear plate 111 and seamlessly extend. In an embodiment, only one of the areas of the front plate 102 (or the rear plate 111), which bend to the rear plate 111 (or front plate 102) and extend may be included in one edge of the first surface 110A. According to an embodiment, the front plate 102 or rear plate 111 may be substantially flat and, in this case, may not include an area bending and extending. When an area bending and extending is included, the thickness of the electronic device 100 at the portion including the area bending and extending may be smaller than the thickness of the rest.

According to an embodiment, the electronic device 100 may include at least one or more of a display 101, audio modules 103, 107, and 114, sensor modules 104 and 119, camera modules 105, 112, and 113, key input devices 117, a light emitting device 106, and connector holes 108 and 109. According to an embodiment, the electronic device 100 may exclude at least one (e.g., the key input device 117 or the light emitting device 106) of the components or may add other components.

The display 101 may be visible through a significant portion of the front plate 102. In an embodiment, at least a portion of the display 101 may be visible through the front plate 102 forming the first surface 110A, or through a portion of the side surface 110C. According to an embodiment, the edge of the display 101 may be formed to be substantially the same in shape as an adjacent outer edge of the front plate 102. According to an embodiment (not shown), the interval between the outer edge of the display 101 and the outer edge of the front plate 102 may remain substantially even to give a larger area of exposure the display 101.

According to an embodiment (not shown), the screen display area of the display 101 may have a recess or opening in a portion thereof, and at least one or more of the audio module 114, sensor module 104, camera module 105, and light emitting device 106 may be aligned with the recess or opening. According to an embodiment (not shown), at least one or more of the audio module 114, sensor module 104, camera module 105, fingerprint sensor (not shown), and light emitting device 106 may be included on the rear surface of the screen display area of the display 101. According to an embodiment (not shown), the display 101 may be disposed to be coupled with, or adjacent, a touch detecting circuit, a pressure sensor capable of measuring the strength (pressure) of touches, and/or a digitizer for detecting a magnetic field-type stylus pen. In an embodiment, at least a portion of the sensor modules 104 and 119, and/or at least a portion of the key input device 117 may be disposed in the first areas 110D and/or the second areas 110E.

The audio modules 103, 107, and 114 may include a microphone hole 103 and speaker holes 107 and 114. A microphone for acquiring external sounds may be disposed in the microphone hole 103. In an embodiment, a plurality of microphones may be disposed to detect the direction of the sound. The speaker holes 107 and 114 may include an external speaker hole 107 and a phone receiver hole 114. In an embodiment, the speaker holes 107 and 114 and the microphone hole 103 may be implemented as a single hole, or a speaker may be included without the speaker holes 107 and 114 (e.g., a piezo speaker).

The sensor modules 104 and 119 may generate an electrical signal or data value corresponding to an internal operating state or external environmental state of the electronic device 100. For example, the sensor modules 104 and 119 may include a first sensor module 104 (e.g., a proximity sensor) and/or a second sensor module (not shown) (e.g., a fingerprint sensor), which is disposed on the first surface 110A of the housing 110, and/or a third sensor module 119 and/or a fourth sensor module (e.g., a fingerprint sensor) disposed on the second surface 110B of the housing 110. The fingerprint sensor may be disposed on the second surface 110B or side surface 110C as well as the first surface 110A (e.g., the display 101) of the housing 110. The electronic device 100 may further include, e.g., at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor 104.

The camera modules 105, 112, and 113 may include a first camera device 105 disposed on the first surface 110A of the electronic device 100, and a second camera device 112 and/or a flash 113 disposed on the second surface 110B. The camera devices 105 and 112 may include one or more lenses, an image sensor, and/or an image signal processor. The flash 113 may include, e.g., a light emitting diode (LED) or a xenon lamp. According to an embodiment, one or more lenses (an infrared (IR) camera, a wide-angle lens, and a telephoto lens) and image sensors may be disposed on one surface of the electronic device 100. In an embodiment, flash 113 may emit infrared light. The infrared light emitted by the flash 113 and reflected by the subject may be received through the third sensor module 119. The electronic device 100 or the processor of the electronic device 100 may detect depth information about the subject based on the time point when the infrared light is received from the third sensor module 119.

The key input device 117 may be disposed on the side surface 110C of the housing 110. According to an embodiment, the electronic device 100 may exclude all or some of the above-mentioned key input devices 117 and the excluded key input devices 117 may be implemented in other forms, e.g., as soft keys, on the display 101. According to an embodiment, the key input device may include the sensor module disposed on the second surface 110B of the housing 110.

The light emitting device 106 may be disposed on, e.g., the first surface 110A of the housing 110. The light emitting device 106 may provide, e.g., information about the state of the electronic device 100 in the form of light. According to an embodiment, the light emitting device 106 may provide a light source that interacts with, e.g., the camera module 105. The light emitting device 106 may include, e.g., a light emitting diode (LED), an infrared (IR) LED, or a xenon lamp.

The connector holes 108 and 109 may include a first connector hole 108 for receiving a connector (e.g., a universal serial bus (USB) connector) for transmitting or receiving power and/or data to/from an external electronic device and/or a second connector hole 109 (e.g., an earphone jack) for receiving a connector for transmitting or receiving audio signals to/from the external electronic device.

Figure 3:
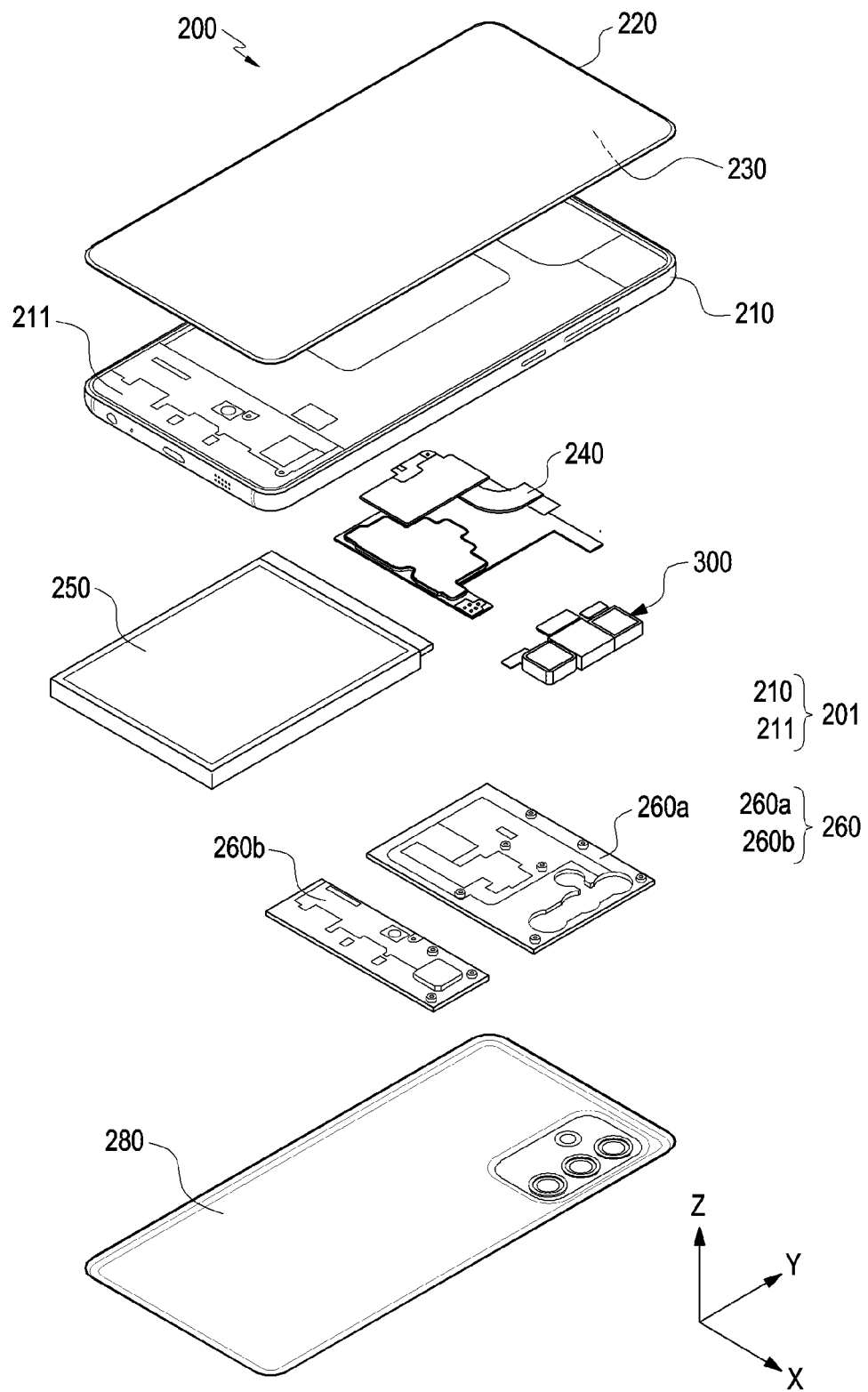
FIG. 3 is an exploded front perspective view illustrating the electronic device of FIG. 1 according to an embodiment.
Figure 4:
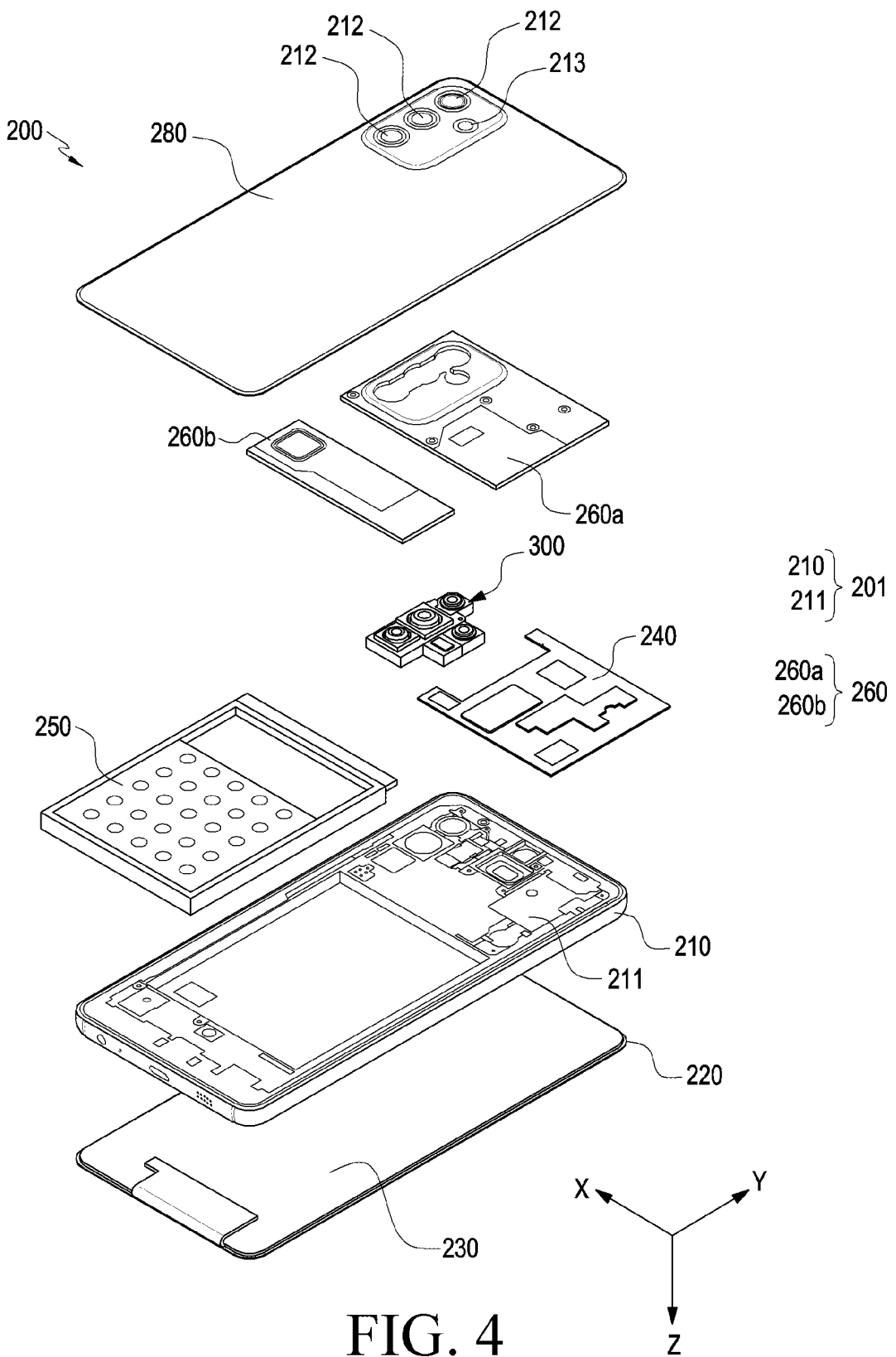
FIG. 4 is an exploded rear perspective view illustrating the electronic device of FIG. 1 according to an embodiment.
Figure 5:
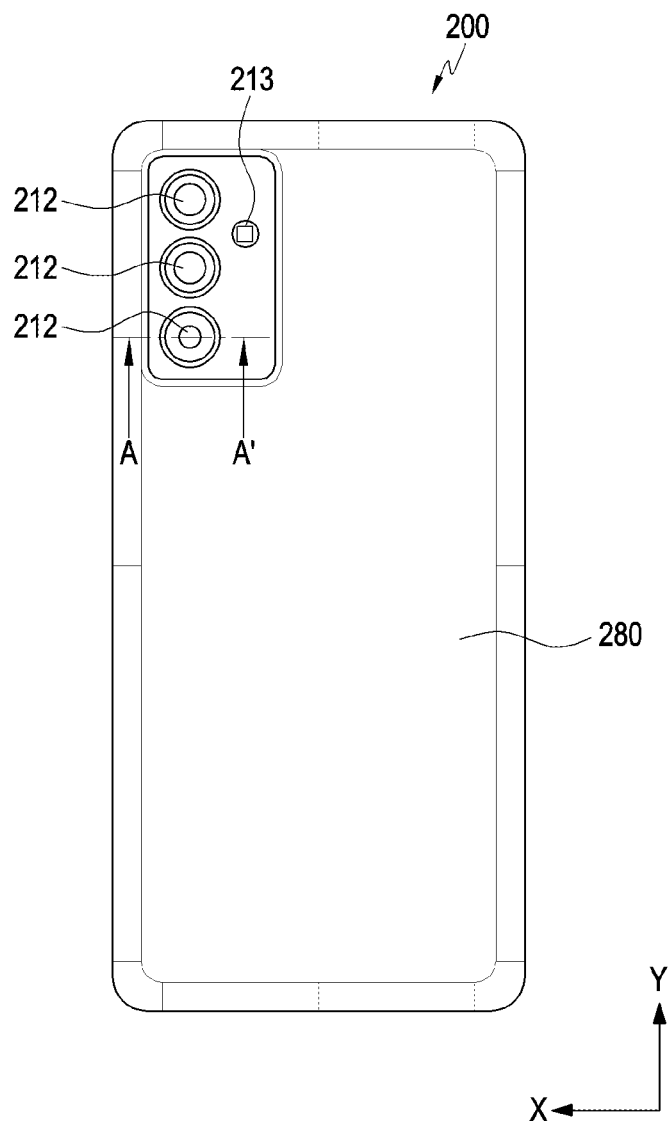
FIG. 5 is a diagram illustrating a rear surface of an electronic device according to an embodiment.

FIG. 3 is an exploded front perspective view illustrating the electronic device of FIG. 1 according to an embodiment. FIG. 4 is an exploded rear perspective view illustrating the electronic device of FIG. 1 according to an embodiment. FIG. 5 is a diagram illustrating a rear surface of an electronic device according to an embodiment.

Referring to FIGS. 3, 4 and 5 (which may be referred to as FIGS. 3 to 5), an electronic device 200 (e.g., the electronic device 100 of FIG. 1 or 2) may include a side structure 210, a front plate 220 (e.g., the front plate 102 of FIG. 1), a display 230 (e.g., the display 101 of FIG. 1), a printed circuit board (or board assembly) 240, a battery 250, an antenna, a rear plate 280 (e.g., the rear plate 111 of FIG. 2), supporting members 211 and 260, and a camera assembly 300. Here, the supporting members 211 and 260 may include a first supporting member 211 (e.g., a bracket) and a second supporting member 260 (e.g., a rear case). According to an embodiment, the electronic device 200 may exclude at least one (e.g., the first supporting member 211 or the second supporting member 260) of the components or may add other components. At least one of the components of the electronic device 200 may be the same or similar to at least one of the components of the electronic device 100 of FIG. 1 or 2 and no duplicate description is made below.

The first supporting member 211 may be disposed inside the electronic device 200 to be connected with the side surface structure 210 or integrated with the side surface structure 210. The first supporting member 211 may be formed of, e.g., a metal and/or non-metallic material (e.g., polymer). When at least partially formed of a metallic material, a portion of the side structure 210 or the first supporting member 211 may function as an antenna. The display 230 may be joined onto one surface of the first supporting member 211, and the printed circuit board (PCB) 240 may be joined onto the opposite surface of the first supporting member 232. A processor, memory, and/or interface may be mounted on the printed circuit board 240. The processor may include one or more of, e.g., a central processing unit, an application processor, a graphic processing device, an image signal processing, a sensor hub processor, or a communication processor.

According to various embodiments, the first supporting member 211 and the side structure 210 may be collectively referred to as a front case or a housing 201. According to an embodiment, the housing 201 may be generally understood as a structure for receiving, protecting, or disposing the printed circuit board 240 or the battery 250. In an embodiment, the housing 201 may be understood as including a structure that the user may visually or tactfully recognize from the exterior of the electronic device 200, e.g., the side structure 210, the front plate 220, and/or the rear plate 280. In an embodiment, the 'front or rear surface of the housing 201' may refer, for example, to the first surface 110A of FIG. 1 or the second surface 110B of FIG. 2. In an embodiment, the first supporting member 211 may be disposed between the front plate 220 (e.g., the first surface 110A of FIG. 1) and the rear plate 280 (e.g., the second surface 110B of FIG. 2) and may function as a structure for placing an electrical/electronic component, such as the printed circuit board 240 or the camera assembly 300.

The memory may include, e.g., a volatile or non-volatile memory. The interface may include, e.g., a high definition multimedia interface (HDMI), a universal serial bus (USB) interface, a secure digital (SD) card interface, and/or an audio interface. The interface may electrically or physically connect, e.g., the electronic device 200 with an external electronic device and may include a USB connector, an SD card/multimedia card (MMC) connector, or an audio connector.

The second supporting member 260 may include, e.g., an upper supporting member 260a and a lower supporting member 260b. In an embodiment, the upper supporting member 260a, together with at least a portion of the first supporting member 211, may be disposed to surround the printed circuit board 240. A circuit device (e.g., a processor, a communication module, or a memory) implemented in the form of an integrated circuit (IC) chip or various electrical/electronic components may be disposed on the printed circuit board 240. According to an embodiment, the printed circuit board 240 may receive an electromagnetic shielding environment from the upper supporting member 260a. In an embodiment, the lower supporting member 260b may be utilized as a structure in which electrical/electronic components, such as a speaker module and an interface (e.g., a USB connector, an SD card/MMC connector, or an audio connector) may be disposed. In an embodiment, electrical/electronic components, such as a speaker module and an interface (e.g., a USB connector, an SD card/MMC connector, or an audio connector) may be disposed on an additional printed circuit board (not shown). In this case, the lower supporting member 260b, together with the other part of the first supporting member 211, may be disposed to surround the additional printed circuit board. The speaker module or interface disposed on the additional printed circuit board (not shown) or the lower supporting member 260b may be disposed corresponding to the audio module 107 or connector holes 108 and 109 of FIG. 1.

The battery 250 may be a device for supplying power to at least one component of the electronic device 200. The battery 450 may include, e.g., a primary cell which is not rechargeable, a secondary cell which is rechargeable, or a fuel cell. At least a portion of the battery 250 may be disposed on substantially the same plane as the printed circuit board 240. The battery 250 may be integrally or detachably disposed inside the electronic device 200.

Although not shown, the antenna may include a conductor pattern implemented on the surface of the second supporting member 260 through, e.g., laser direct structuring. In an embodiment, the antenna may include a printed circuit pattern formed on the surface of the thin film. The thin film-type antenna may be disposed between the rear plate 280 and the battery 250. The antenna may include, e.g., a near-field communication (NFC) antenna, a wireless charging antenna, and/or a magnetic secure transmission (MST) antenna. The antenna may perform short-range communication with, e.g., an external device or may wirelessly transmit or receive power necessary for charging. According to an embodiment of the present invention, another antenna structure may be formed by a portion or combination of the side structure 210 and/or the first supporting member 211.

The camera assembly 300 may include at least one camera module, e.g., at least one of the camera modules 301, 302, 303, and 304 of FIGS. 6A, 6B and 6C to be described below. Inside the electronic device 200, the camera assembly 300 may receive at least a portion of the light incident through the optical hole or the camera windows 212 and 213. In an embodiment, the camera assembly 300 may be disposed on the first supporting member 211 in a position adjacent to the printed circuit board 240. In an embodiment, the camera module(s) of the camera assembly 300 may be generally aligned with either one of the camera windows 212 and 213 and be a least partially overlapped and surrounded by the second supporting member 260 (e.g., the upper supporting member 260a). To prevent and/or reduce tilting of the camera module in disposing the camera assembly 300, a portion of the second supporting member 260 or the housing 201 may include at least one elastic structure which is described below in connection with various example embodiments.

It should be noted that in the following detailed description, reference may be made to the electronic devices 100 and 200 of the foregoing embodiments, and components, which may easily be understood through the foregoing embodiments, are assigned the same reference numerals or omitted and a description thereof may not be repeated.

Figure 6A:
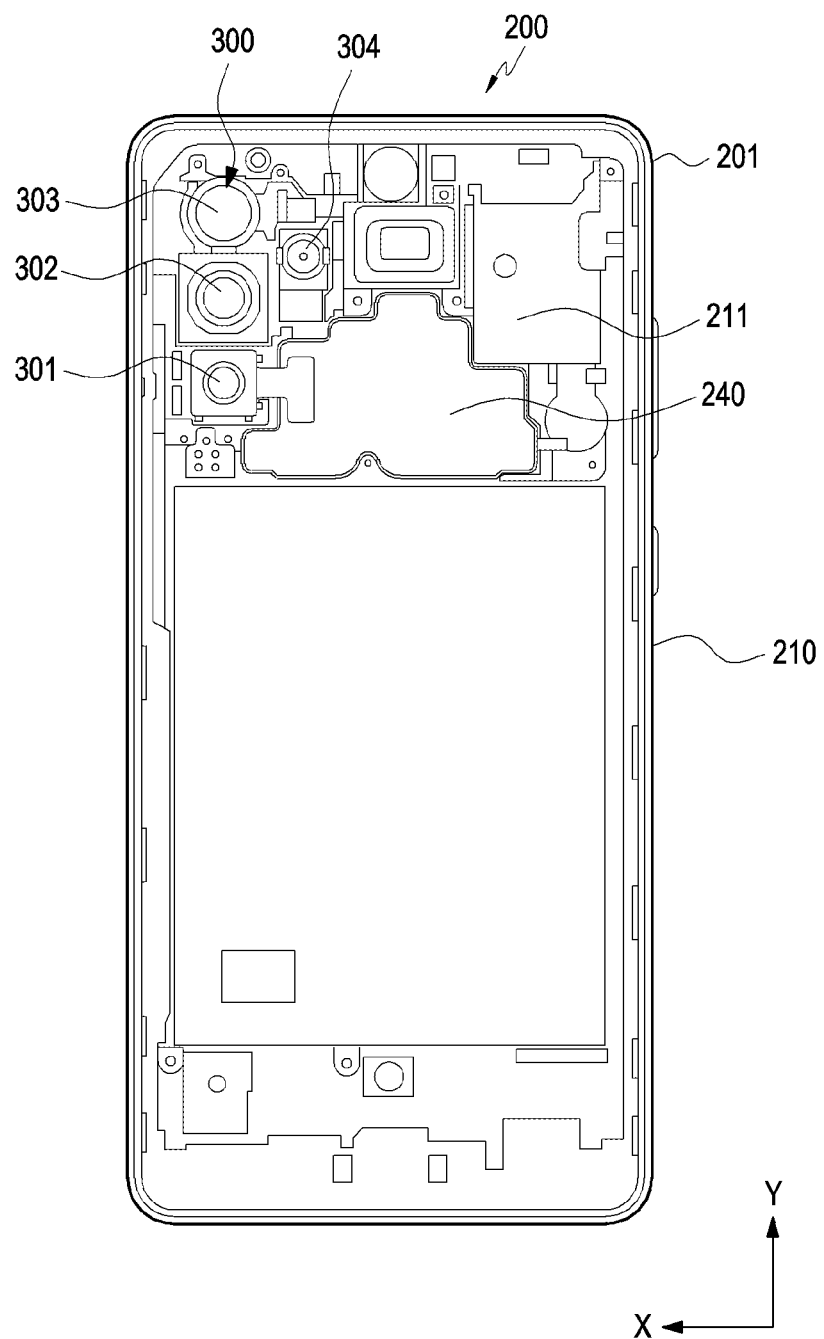
FIG. 6A is a diagram illustrating an example in which a camera assembly is disposed in an electronic device according to an embodiment.

FIG. 6A is a diagram illustrating an example in which a camera assembly is disposed in an electronic device according to an embodiment. FIG. 6B is a cross-sectional view of an electronic device taken along A-A' of FIG. 5 according to an embodiment. FIG. 6C is a diagram illustrating a camera module included in a camera assembly in an electronic device according to an embodiment.

Referring to FIG. 6A, a camera assembly 300 may include a plurality of camera modules 301, 302, 303, and 304 and may be disposed at an upper portion of one side on one surface of the housing 201 or first supporting member 211. The position of the camera assembly 300 may be appropriately changed according to the actual shape of the electronic device (e.g., the electronic devices 100 and 200 of FIGS. 1 to 4) or the position held by the user in capturing the subject. Each of the plurality of camera modules 301, 302, 303, and 304 may be formed in a position corresponding to the camera windows 212 and 213 of the electronic device 200 of FIGS. 4 and 5. In an embodiment, the camera assembly 300 may include at least a standard camera module of a (ultra) wide-angle camera module, a standard camera module, a macro camera module, a depth detection camera module, and/or an infrared light source. When the electronic device 200 or the camera assembly 300 includes the plurality of camera modules 301, 302, 303, and 304, the electronic device 200 or the processor of the electronic device 200 may obtain a plurality of images for one subject using at least two among the plurality of camera modules 301, 302, 303, and 304 and obtain a high-quality image by synthesizing the plurality of obtained images.

According to various embodiments, the camera assembly 300 is generally disposed not to overlap the printed circuit board (e.g., the printed circuit board 240 of FIG. 3 or 4), but when viewed in the plan view of FIG. 6A, at least one, e.g., the camera module indicated by reference numeral '304:' among the plurality of camera modules 301, 302, 303, and 304 may be disposed to substantially overlap the printed circuit board 240. For example, the plurality of camera modules 301, 302, 303, and 304 may have different thicknesses measured in the Z-axis direction of FIG. 3 or 4, and a camera module manufactured with a relatively large thickness may be disposed not to overlap the printed circuit board 240, and a camera module having a relatively small thickness may be disposed to overlap the printed circuit board 240. Referring to FIG. 6A, the camera modules indicated by reference numerals '301', '302', and '303' are disposed not to overlap the printed circuit board 240. The camera module indicated by the reference number '304' may be disposed to overlap the printed circuit board 240. In an embodiment, other optical elements, such as an infrared light source, infrared receiver, light emitting diode, and xenon lamp, may be added to the camera assembly 300 or replace eat least one of the plurality of camera modules 301, 302, 303, and 304 shown.

In the following detailed description, various embodiments may be described by taking the camera module indicated by the reference number '301' as an example. The camera module 301 mentioned in the following detailed description may include lens assembly 301a and a camera housing 301b surrounding the lens assembly 301a to protect an electronic component (e.g., the image sensor 301c) and a substrate (e.g., the substrate 301d) in the camera module 301 and the lens assembly 301a. Although not directly mentioned, the configuration or arrangement of the camera modules 302, 303, and 304 assigned other reference numbers than '301' may also be similar to the configuration or arrangement of the camera module 301.

Figure 6B:
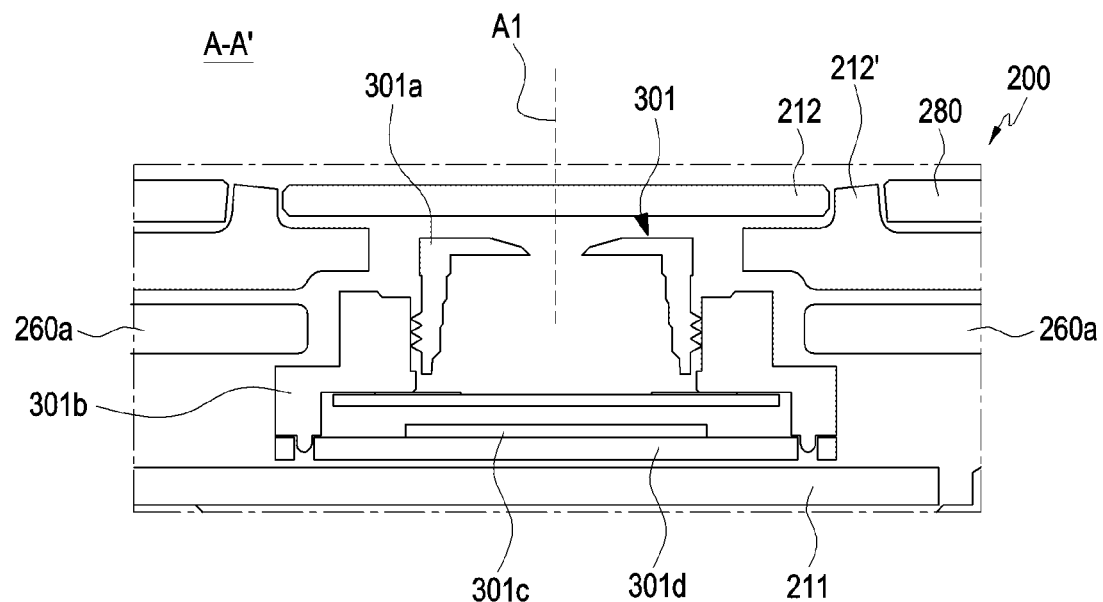
FIG. 6B is a cross-sectional view of an electronic device taken along A-A' of FIG. 5 according to an embodiment.

Referring to FIG. 6B, at the cross-sectional view of the electronic device 200, in an ideal or intentional situation, the center of the lens assembly 301a of the camera module 301 may be aligned to the center axis A1 of the camera window 212 disposed in the position corresponding thereto. Further, in an ideal or intentional situation, as shown in FIG. 6B, the camera module 301 may remain parallel, not tilting, with respect to the first supporting member 211. However, a dimensional difference exceeding an allowable tolerance may occur between the components (e.g., the lens assembly 301a and the camera housing 301b) of the camera module 301 or between a component of the camera module 301 and other surrounding components (e.g., the first supporting member 211) in the process of assembly or for other reasons, causing at least some camera module 301 of the plurality of camera modules to tilt. Or, in the process of using the electronic device 200, the camera module 301 and/or its surrounding component may be physically impacted, tilting the camera module 301.

Figure 6C:
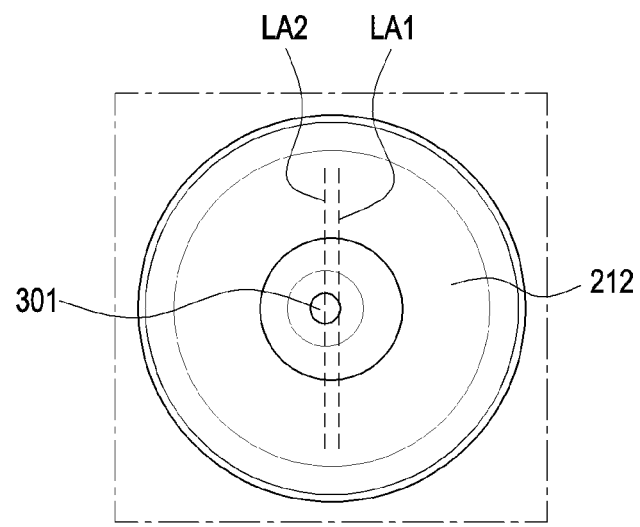
FIG. 6C is an diagram illustrating a camera module included in a camera assembly in an electronic device according to an embodiment.

As such, if the camera module 301 is tilted for various reasons, eccentricity may occur in which the center axis line LA1 drawn from the camera window 212 is misaligned with the center axis line LA2 drawn from the lens assembly 301a of the camera module 301 as shown in FIG. 6C.

Figure 7A:
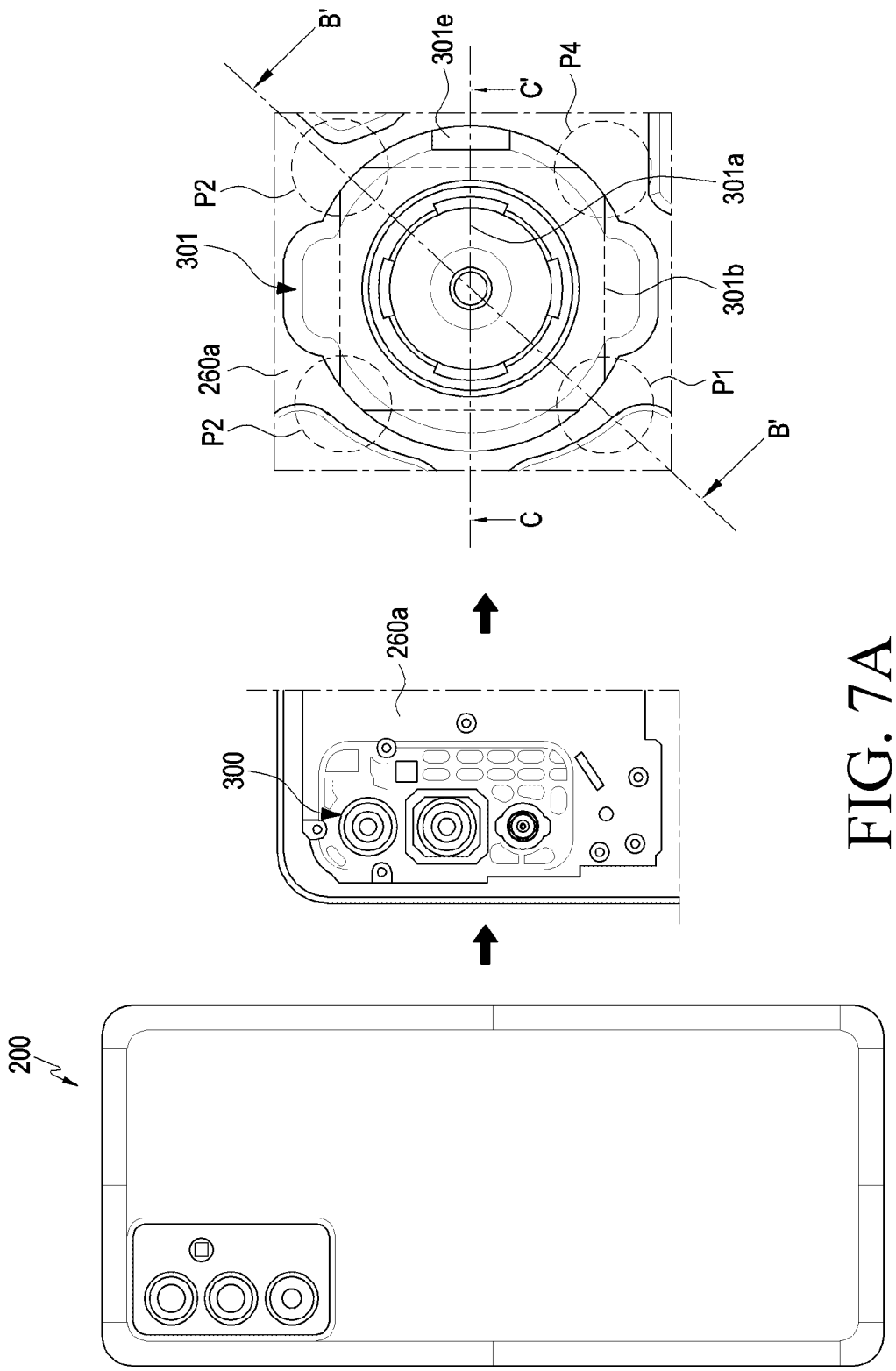
FIG. 7A is a diagram illustrating a camera module and a supporting member of an electronic device according to an embodiment.
Figure 7B:
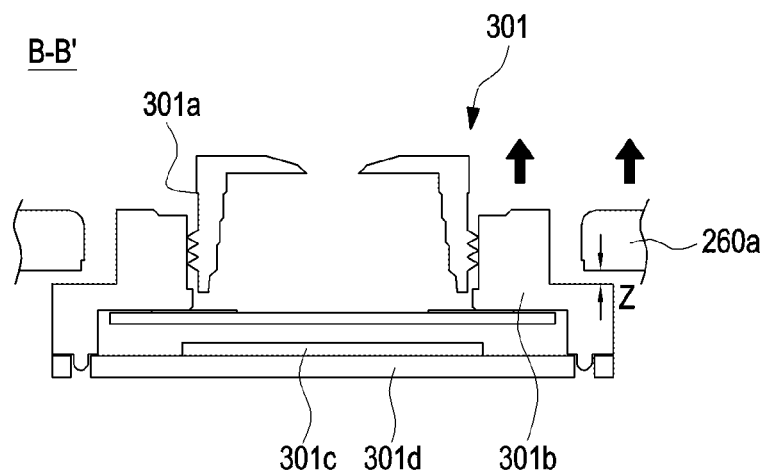
FIG. 7B is a cross-sectional view of the camera module taken along B-B' of FIG. 7A according to an embodiment.
Figure 7C:
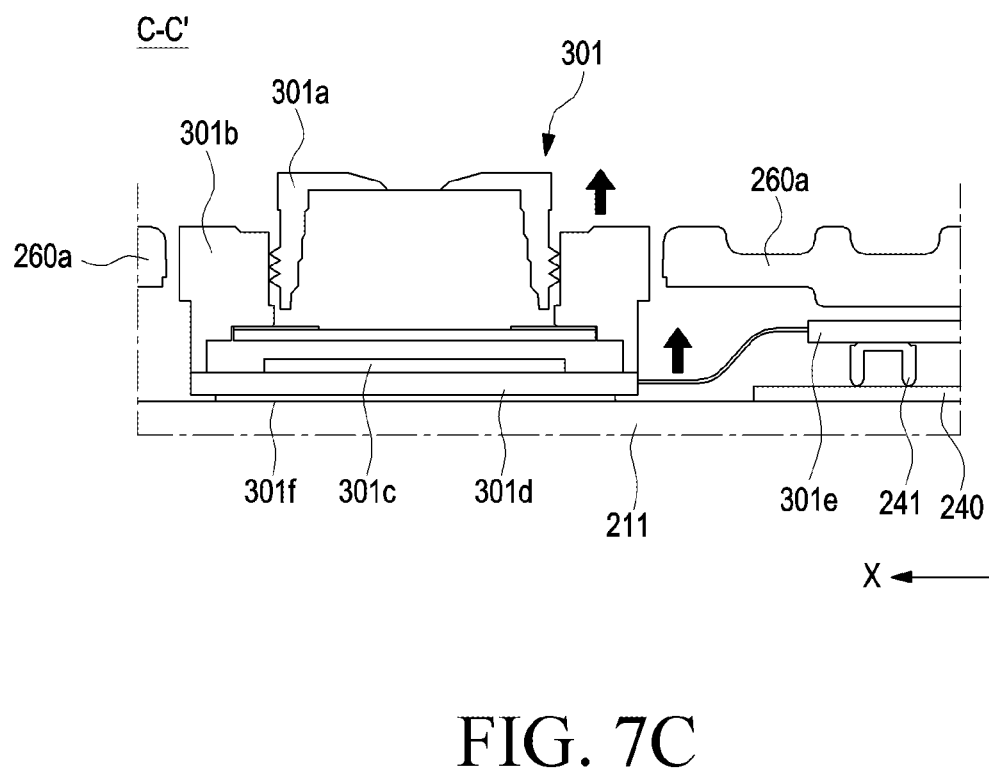
FIG. 7C is a cross-sectional view of the camera module taken along C-C' of FIG. 7A according to an embodiment.

FIG. 7A is a diagram illustrating a camera module and a supporting member of an electronic device according to an embodiment. FIG. 7B is a cross-sectional view of the camera module taken along B-B' of FIG. 7A according to an embodiment. FIG. 7C is a cross-sectional view of the camera module taken along C-C' of FIG. 7A according to an embodiment.

FIGS. 7A, 7B and 7C (which may be referred to as FIGS. 7A to 7C) may illustrate an embodiment for designing a camera module to prevent and/or reduce tilting of the camera module described above in connection with FIG. 6C.

As shown in FIG. 7A, according to an embodiment, the electronic device 200 may prevent and/or reduce tilting of the camera assembly 300 and/or the camera module included therein, using the second supporting member 260. As an example, the upper supporting member 260a of the second supporting member 260 may be formed to at least partially overlap the camera assembly 300. In this case, when viewed from above the camera module 300, the upper supporting member 260a may be formed to at least partially cover an edge of the camera housing 301b of the camera module (e.g., the camera module 301) where a camera tilting may occur. For example, as shown in FIG. 7A, the upper supporting member 260a may be formed to cover and support the camera housing 301b in a plurality of positions (e.g., P1, P2, P3, and P4).

Referring to FIG. 7B, according to an embodiment, when the upper supporting member 260a of the second supporting member 260 to at least partially is formed to at least partially overlap the camera assembly 300, the upper supporting member 260a may be formed to have a predetermined gap (Z-gap) from the camera housing 301b of the camera module 301. In this case, the gap (Z-gap) may be set considering the inter-component dimensional tolerance between the camera housing 301b and the upper supporting member 260a. However, although the gap (Z-gap) is set considering the inter-component dimensional tolerance, issues with tilting of the camera module 301 may be difficult to address.

For example, referring to FIGS. 7A and 7C, a flexible printed circuit board 301e may be used to electrically connect the camera module 301 with the printed circuit board 240. According to an embodiment, the flexible printed circuit board 301e may be coupled to a connector 241 that extends to one side of the camera module 301. Use of the flexible printed circuit board 301e may advantageously make the mounting of a component in the housing of the electronic device 200 more flexible but, if the length of the flexible printed circuit board 301e exceeds to the tolerance limit, the camera module 301 may be lifted due to the repulsive force by the flexible printed circuit board 301e. In such a case, although the upper supporting member 260a is formed to have a predetermined gap (Z-gap) from the camera housing 301b of the camera module 301, camera tilting may occur. To address such issue, an adhesive member, e.g., fixing tape 301f, may be included in an embodiment as shown in FIG. 7C but, despite a chance of preventing or reducing camera tilting, lead to an increase in manufacturing cost and the height of the camera module.

Figure 8:
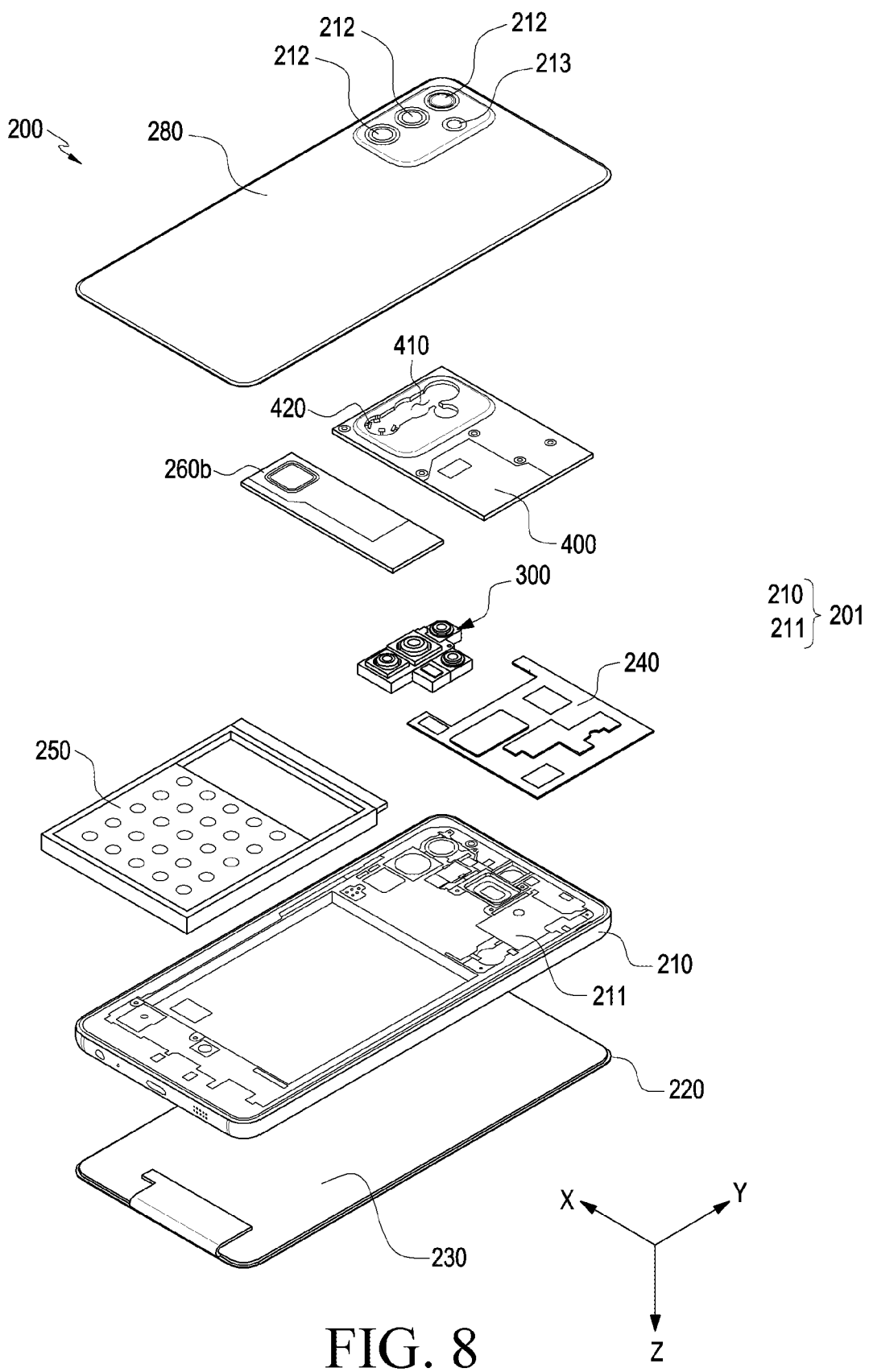
FIG. 8 is an exploded perspective view illustrating an electronic device according to an embodiment.

According to various embodiments of the disclosure, there may be provided an electronic device that may prevent and/or reduce lifting and/or tilting of a component, as at least addressing the foregoing issues and/or drawbacks, through the example embodiments taken in conjunction with FIG. 8 and its subsequent figures. For example, in the following embodiments, there may be provided an electronic device in which the optical hole, camera window, and/or camera module are easy to align.

FIG. 8 is a rear exploded perspective view of an electronic device according to various embodiments.

According to various embodiments of the disclosure, an electronic device 200 may include a printed circuit board 240, at least one component, and a supporting structure 400 with an extension 420 which extends toward an interfacing area of the at least one component to support at least a portion of the at least one component.

Here, 'at least one component' may refer to a component that may be lifted and/or tilted as described in the embodiments shown in FIGS. 6A to 7C, among the components received in the electronic device 200. As a representative example for 'at least one component', in the above-described embodiments and the embodiments to be described below, the camera module 301 is described with reference, but it should be noted that the scope of the disclosure is not limited to the camera module 301. Further, 'interfacing area' herein may refer to an area where an input or output is performed to or using the 'at least one component' or the 'at least one component' is exposed to the outside. For example, in the foregoing and following embodiments, a camera is described as an example of the at least one component for the interfacing area, so that the area where light passes to the lens may be defined as an interfacing area. However, it should be noted that the interfacing area is not limited to a specific embodiment, but may rather be defined as various ones corresponding to various embodiments for the 'at least one component.' Hereinafter, for the shake of convenience, the following description focuses primarily on the camera module 301 as an example of the 'at least one component' and a light-sensing area (hereinafter, simply referred to as a "sensing area") as an example of the 'interfacing area.' As another example, when the 'at least one component' corresponds to, e.g., the audio module 103, 104, or 114, such as a speaker, the 'interfacing area' may be a microphone hole 103, an external speaker hole 107 and/or a receiver hole 114 for calling.

According to various embodiments of the disclosure, the electronic device 200 may include a camera module 301 electrically connected to the printed circuit board 240. The camera module 301 may include a sensing area. According to an embodiment, the sensing area may be an area in which the image sensor 301c shown in FIGS. 7B and 7C senses light. However, the definition of the sensing area is not necessarily limited to the position where the image sensor 301c is disposed, but may also refer, for example, to a central portion of the overall dimension of the camera module 301 for sensing light or the center of gravity.

According to various embodiments of the disclosure, an extension 420 from the supporting structure 400 may extend toward the sensing area of the camera module 301. For example, the sensing area of the camera module may have a predetermined angle of view, and the extension part 420 of the supporting structure 400 may extend toward the center of the angle of view. Referring to FIG. 8, the supporting structure 400 is a supporting member disposed inside the housing of the electronic device 200, and may correspond to the upper supporting member 260a described above in connection with FIG. 4. An opening 410 for interfacing at least one component may be formed in the supporting structure 400. In the embodiment of FIG. 8, the opening 410 may provide a light traveling path for sensing the light by the camera module 301. In this case, at least a portion of the extension 420 may extend toward the center of the opening 410. The opening 410 having a size corresponding to all camera modules included in the camera assembly 300 is illustrated in FIG. 8, but is not limited thereto.

Figure 9:
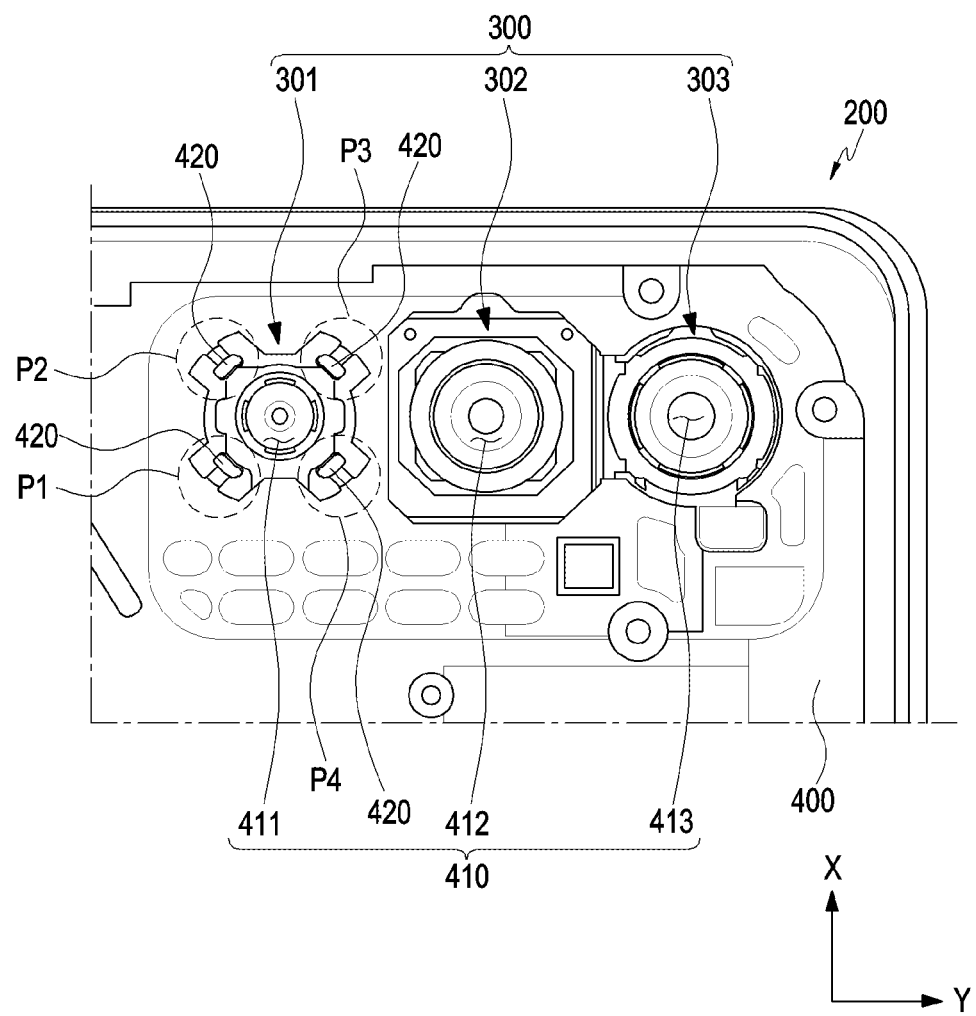
FIG. 9 is a diagram illustrating an example in which a support member including an extension covers a camera module according to an embodiment.
Figure 10:
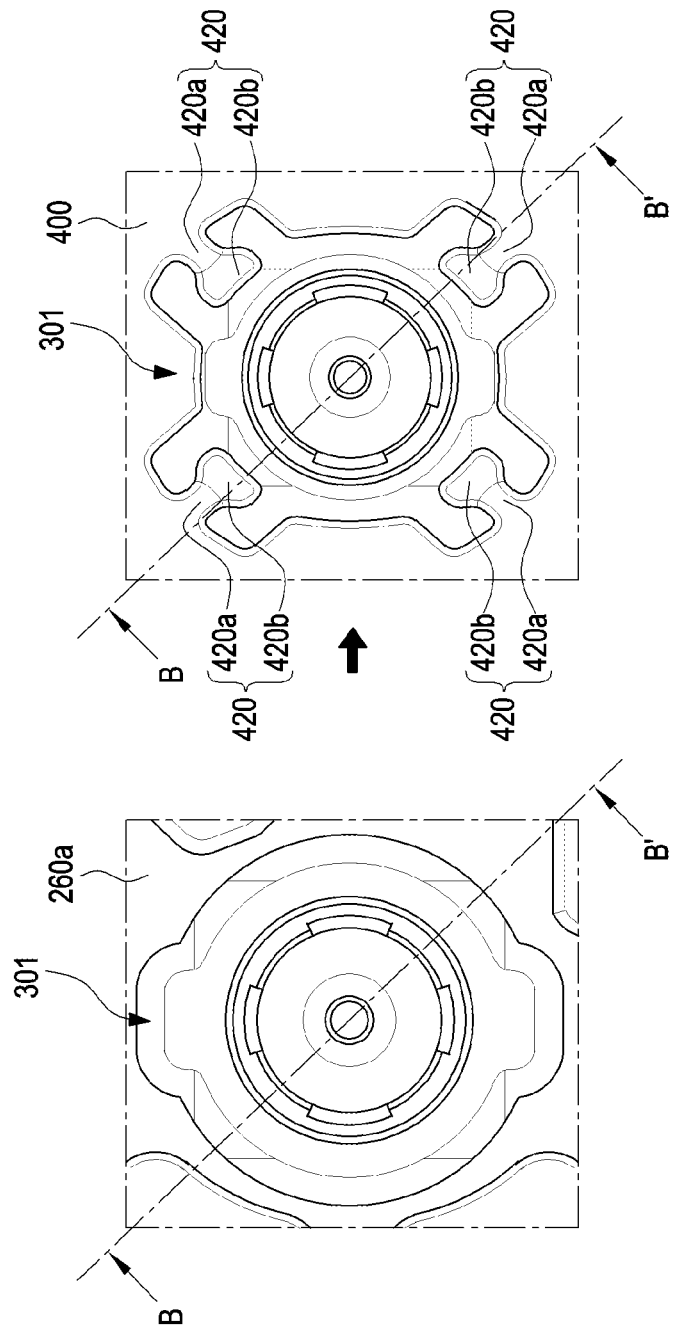
FIG. 10 is a diagram illustrating a supporting structure including a Z-gap structure and a camera module and a front view illustrating a member including a cantilever-shaped extension and a camera module according to an embodiment.
Figure 11:
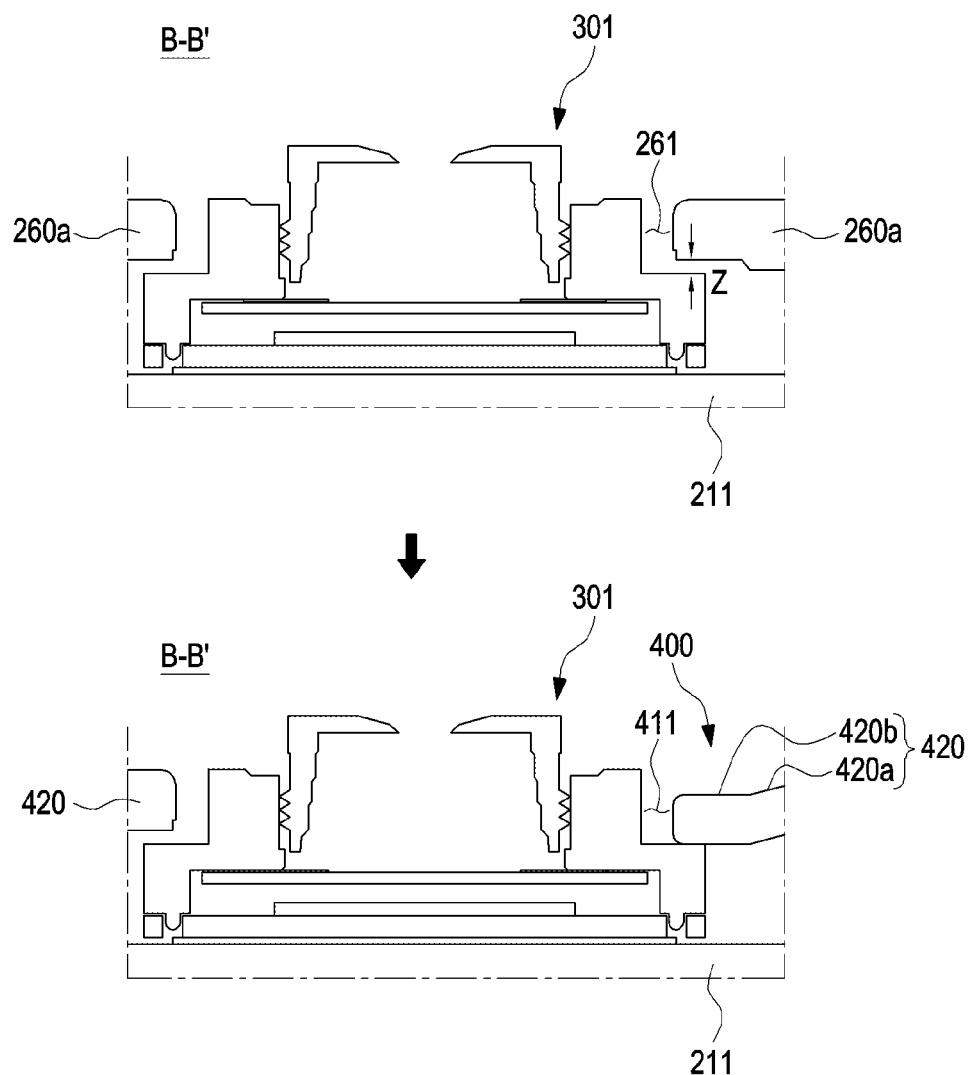
FIG. 11 is a cross-sectional view illustrating a supporting structure including a Z-gap structure and a camera module and a cross-sectional view illustrating a supporting structure including a cantilever-shaped extension and a camera module according to an embodiment.

FIG. 9 is a diagram illustrating an example in which a supporting structure including an extension covers a camera assembly according to various embodiments. FIG. 10 is a diagram illustrating a supporting structure member including a Z-gap structure and a camera module and a front view illustrating a member including a cantilever-shaped extension and a camera module according to various embodiments. FIG. 11 is a cross-sectional view illustrating a supporting structure including a Z-gap structure and a camera module and a cross-sectional view illustrating a supporting structure including a cantilever-shaped extension and a camera module according to various embodiments.

In FIGS. 10 and 11, to indicate the intent that a supporting structure with a cantilever-shaped extension and a camera module have been devised by enhancing the supporting structure with a Z-gap structure and the camera module, before (supporting structure with a Z-gap structure and camera module) and after (supporting structure with an extension and camera module) are indicated by arrows. The opening 410 may include a plurality of subopenings 411, 412, and 413. Referring to FIG. 9, it is shown that the opening 410 is partitioned into the plurality of subopenings 411, 412, and 413. The opening 410 may be partitioned into the plurality of subopenings 411, 412, and 413 to provide a separate interfacing path for each camera module 301, 302, and 303 included in the camera assembly 300. For example, in various embodiments of the disclosure, that the extension 420 extends toward the center of the opening 410 may refer, for example, to the extension 420 extending toward the center of at least one of the subopenings 411, 412, and 413. For example, FIG. 9 illustrates an embodiment in which the extension 420 extends toward the center of the first subopening 411 corresponding to the camera module corresponding to reference numeral 301 among the plurality of subopenings 411, 412, and 413.

The extension 420 extending from the supporting structure 400 may correspond to an elastic cantilever. According to various embodiments of the disclosure, tilting of the camera module 301 may be prevented and/or reduced using the behavior of the elastic cantilever. The extension 420 may include a fixed end 420a connected to the supporting structure 400 and a cantilever-shaped free end 420b, and the free end 420b may touch the camera housing 301b of the camera module 301. According to an embodiment, the load on the camera module 301 and/or surrounding structures may be estimated through the extension 420 in physical contact with the camera housing 301b of the camera module 301. The cantilever-shaped extension 420 may be designed considering detailed dimensions for the camera module 301 and design tolerances with the surrounding structures and the loads of the camera module 301 and/or surrounding structures on the extension 420 when the product is actually assembled.

According to various embodiments, the extension 420 may include a plurality of extensions 420. Referring to FIGS. 9 and 10 together, the extension 420 may include a plurality of extensions 420 which may extend toward the center of the opening 410 from various positions P1, P2, P3, and P4 of the supporting structure 400. According to an embodiment, the plurality of extensions may be radially disposed around the interfacing area and be disposed at equal intervals.

Referring to FIGS. 9 to 11 together, the extension 420 may have a structure in which a portion thereof in contact with the component is depressed toward the component. For example, the extension 420 may have a structure in which a portion thereof, in contact with the camera housing 301b of the camera module 301 is depressed toward the housing 301b. Here, that the extension 420 has a 'depressed structure' may refer, for example, to a portion of the extension 420 being bent toward the component, according to an embodiment. Accordingly, the free end 420b and the fixed end 420a of the extension 420 may form a step therebetween. Further, that the extension 420 'has a depressed structure' may refer, for example, to the first portion (e.g., the fixed end 420a) of the extension 420 extending in a first direction toward the interfacing area of the at least one component, and the second portion (e.g., the free end 420b) in contact with the at least one component extends in a second direction different from the first direction. In this case, the second direction may refer, for example, to a direction orthogonal to the first direction. Since the extension 420 has a depressed structure in this way, it is possible to prevent and/or reduce tilting, or reduce the degree of tilting, of the camera module 301 according to deformation of the camera module 301 and/or surrounding structures thereof.

Figure 12:
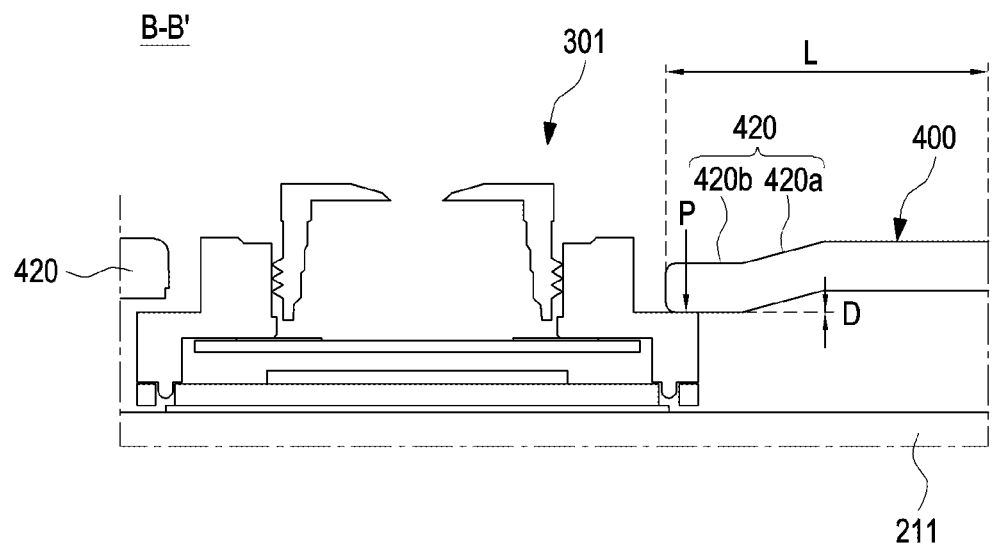
FIG. 12 is a cross-sectional view illustrating a supporting structure including a cantilever-shaped extension and a camera module according to an embodiment.

FIG. 12 is a cross-sectional view illustrating a supporting structure including a cantilever-shaped extension and a camera module according to an embodiment.

According to an embodiment of the disclosure, the supporting structure 400 including the cantilever-shaped extension 420 may be designed so that the load P of the extension 420, considering the Young's modulus (E), length (L), displacement (D), and section modulus (I) of the extension 420, does not exceed the breaking strength of the component (e.g., the camera module 301). Here the load may be calculated as equation $$P = \frac{3EID}{L^3}.$$

Here, the displacement D of the extension 420 may correspond to the dimensional tolerance in component design. If this is applied to the embodiment of FIG. 12, the extension 420 may be designed so that the load P of the extension 420 exceeds the elastic force generated by the camera module 301 and/or its surrounding structures but does not exceed the breaking strength of the camera module 301. For example, the extension 420 having a structure depressed toward the camera housing 301b remains in contact with the camera housing 301b, but in the process of assembling the camera module 301 to an electronic device or using the electronic device, elastic force may be temporarily or continuously accumulated by deformation of the camera module 301 and/or its surrounding structures. The extension 420 may be designed not to be broken by the so accumulated elastic force and not to exceed the breaking strength of the camera module 301. In this case, the extension 420 may be designed so that the breaking strength of the camera module 301 is not exceeded but the displacement D maintains a (−) tolerance to allow a predetermined load to be continuously applied to the camera module 301. Here, that the displacement D has a (−) tolerance may refer, for example, to the extension 420 pressing down the camera housing 301b (e.g., in the Z-axis direction of FIG. 4) in a state where no external force is applied. By allowing the displacement (D) to have a (−) tolerance, it may be advantageous to prevent and/or reduce tilting of the camera module 301 and to reduce the degree of tilting as compared with designing to have a Z gap. Further, unlike using an adhesive member, e.g., a tape, to prevent and/or reduce tilting in the Z-gap design, application of the cantilever-shaped extension 420 of the disclosure may eliminate the need for a separate adhesive member, e.g., a tape.

Figure 13:
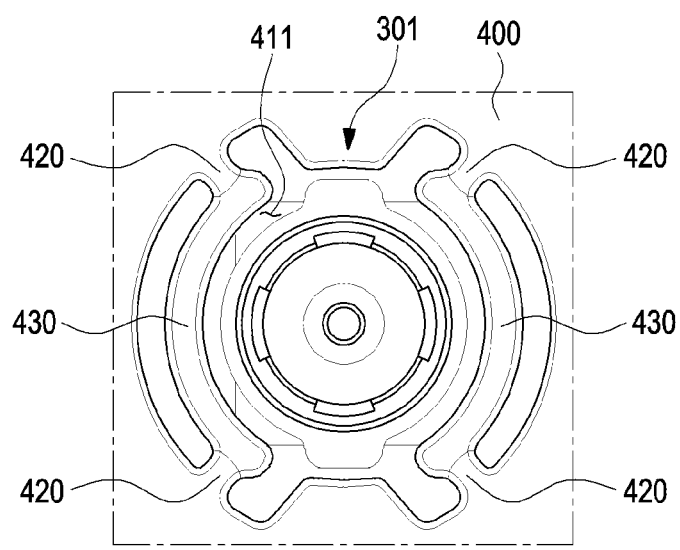
FIG. 13 is a diagram illustrating an extension including a bridge structure according to an embodiment.

FIG. 13 is a diagram illustrating an extension including a bridge structure according to an embodiment.

Referring to FIG. 13, according to an embodiment, the electronic device 200 may include an extension 420 that further includes a bridge structure 430. The extension 420 may include a plurality of extensions. At least two extensions among the plurality of extensions may be connected to each other to form the bridge structure 430. For example, the free end 420b of the extension 420 may be connected to the free end 420b of another adjacent extension 420 to form the bridge structure 430.

In the camera module 301, rather than the edge of the camera housing 301b being supported by the cantilever-shaped extension 320 alone, at least two extensions among the plurality of extensions may be connected to each other to form the bridge structure 430, making it possible to more securely and stably support the camera housing.

Referring to FIG. 13, the bridge structure 430 is illustrated as having a left/right symmetric structure with respect to an imaginary line passing through the camera module 301. Further, although not shown in the drawings, the bridge structure 430 may have a structure symmetrical up/down/left/right with respect to the center of the camera module 301. However, without being limited thereto, the bridge structure 430 may not necessarily have a symmetrical structure. According to an embodiment, the electronic device 200 may be formed such that some extensions among the plurality of extensions have a greater elastic force than the other extensions. For example, as shown in FIGS. 7A and 7C, in the electronic device 200, the camera module 301 and the flexible printed circuit board 301e may be connected to each other through the flexible printed circuit board 301e extending to one side of the camera module 301. In this case, an extension disposed in the direction in which the flexible printed circuit board extends among the plurality of extensions may be formed to have a greater elastic force than the other extensions. For example, referring to FIGS. 7A, 7C, and 13 together, when there is the flexible printed circuit board 301e extending to one side from the camera module 301 as shown in FIGS. 7A and 7C, the bridge structure 430 which has a symmetrical shape with respect to the camera module 301 is not formed as shown in FIG. 13 while the bridge structure 430 may be formed only in the direction in which the flexible printed circuit board 301e extends.

Figure 14:
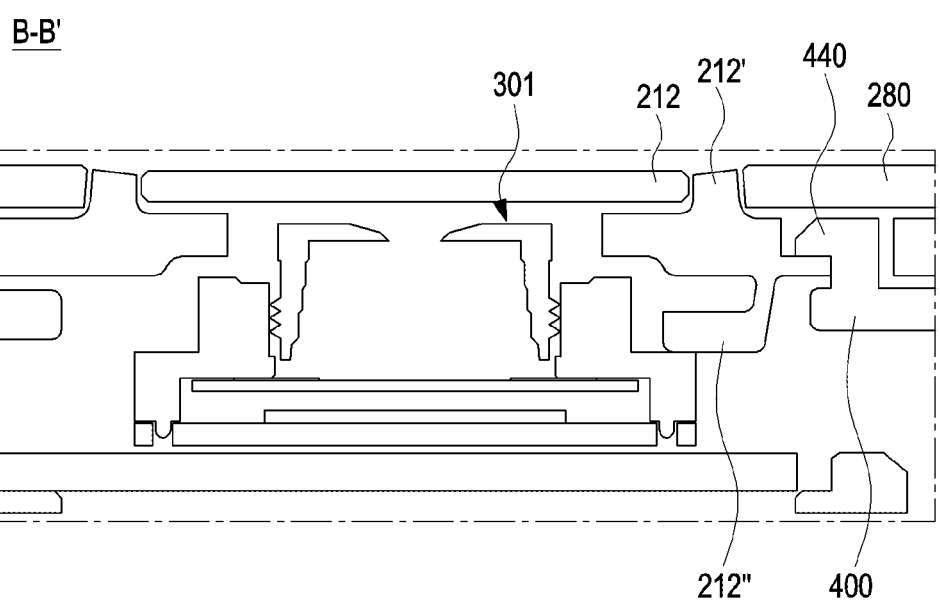
FIG. 14 is a cross-sectional view illustrating a coupled structure of a decoration member and a supporting structure according to an embodiment.

FIG. 14 is a cross-sectional view illustrating a coupled structure of a decoration member 212' and a supporting structure 400 according to an embodiment.

Referring to FIG. 14, according to various embodiments, in the electronic device 200, unlike the embodiments described above in connection with FIGS. 4 to 13, an extension 212" may be formed in the decoration member 212', rather than an extension being formed in the supporting structure 400. In this case, the decoration member 212' is a portion forming part of the exterior of the housing, and at least a portion thereof may be disposed inside the housing while at least one other portion thereof is exposed to the surface of the housing.

According to the embodiments shown in FIG. 14, the extension 212" may be formed to extend from the portion (e.g., a lower portion of the decoration member 212') disposed inside the housing of the decoration member 212' to the camera housing. According to an embodiment, the supporting structure 400 may be coupled to the decoration member 212' where the extension 212" is formed. For example, as shown in FIG. 14, the supporting structure 400 may be coupled to the decoration member 212' via a hook structure 440. Further, various embodiments for the extension described above in connection with FIGS. 4 to 13 may be applied to the embodiment of FIG. 14.

The electronic device according to various embodiments may be one of various types of devices. The electronic devices may include, for example, a portable communication device (e.g., a smartphone), a computer device, a portable multimedia device, a portable medical device, a camera, a wearable device, a home appliance, or the like. According to an embodiment of the present invention, the electronic device is not limited to the above-listed embodiments.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment of the disclosure, there may be provided an electronic device (e.g., the electronic device 200 of FIG. 8) comprising: a printed circuit board (e.g., the printed circuit board 240 of FIG. 8); at least one component (e.g., the camera module 300 of FIG. 8) electrically connected with the printed circuit board; a housing (e.g., the housing 201 of FIG. 8) accommodating the printed circuit board and the at least one component; and a supporting structure (e.g., the supporting structure 400 of FIG. 8) having an extension (e.g., the extension 420 of FIG. 8) extending toward an interfacing area of the at least one component configured to support at least a portion of the at least one component.

According to an embodiment, the extension may comprise an elastic cantilever.

According to an embodiment, the supporting structure may include a portion in contact with the at least one component is depressed toward the at least one component.

According to an embodiment, the extension may have a first portion (e.g., the fixed end 420a of FIG. 10) extending from the housing in a first direction toward the interfacing area of the at least one component and a second portion (e.g., the free end 420b of FIG. 10) contacting the at least one component and extending in a second direction different from the first direction. The second direction may be a direction orthogonal to the first direction.

According to an embodiment, the supporting structure may include a supporting member (e.g., the second supporting member 260a of FIG. 4) disposed inside the housing.

According to an embodiment, the supporting structure may include a decorative portion (e.g., the decoration member 212' of FIG. 14) that forms a portion of the exterior of the housing.

According to an embodiment, the decoration member may be coupled with a supporting member disposed inside the housing.

According to an embodiment, the at least one component may include a camera module.

According to an embodiment, the camera module may include a lens assembly and a camera housing surrounding at least a portion of the lens assembly. The extension may be configured to support an edge of the camera housing.

According to an embodiment, the supporting structure may include an opening (e.g., the opening 410 of FIG. 8) configured to interface with the at least one component.

According to an embodiment, at least a portion of the extension may extend toward a center of the opening.

According to an embodiment, the extension may include a plurality of extensions.

According to an embodiment, the plurality of extensions may be radially disposed around the interfacing area.

According to an embodiment, the plurality of extensions may be disposed at equal intervals around the interfacing area.

According to an embodiment, at least two of the plurality of extensions may be connected to each other to form a bridge structure (e.g., the bridge structure 430 of FIG. 13).

According to an embodiment, the at least one component may be connected with the printed circuit board through a flexible printed circuit board extending in a direction. An extension disposed in a direction in which the flexible printed circuit board extends among the plurality of extensions may have a greater elastic force than another extension.

According to an embodiment of the disclosure, there may be provided an electronic device including a camera module, comprising: a printed circuit board; a camera module including a lens assembly and a camera housing surrounding at least a portion of the lens assembly and electrically connected with the printed circuit board; a housing accommodating the printed circuit board and the camera module and formed therein a sensing area of the camera module; and a support including an extension extending toward the sensing area of the camera module configured to support at least a portion of the camera housing.

According to an embodiment, the extension may comprise an elastic cantilever.

According to an embodiment, the extension may include a first portion extending from the housing in a first direction toward the sensing area of the camera module and a second portion contacting the camera housing and extending in a second direction different from the first direction.

According to an embodiment, the member may be a supporting member disposed inside the housing.

According to an embodiment, the supporting structure may comprise a decoration member that forms a portion of the exterior of the housing.

While the disclosure has been illustrated and described with reference to an embodiment thereof, it will be apparent to those skilled in the art that various changes in form and detail may be made thereto without departing from the spirit and scope of the present disclosure, including the appended claims and their equivalents. It will also be understood that any of the embodiment(s) described herein may be used in conjunction with any other embodiment(s) described herein.

For example, the supporting structure may correspond not only to the supporting member (e.g., the second supporting member 260a of FIG. 4) of the electronic device but also to another component or structure. As an example, the camera module is described by taking, as an example, a structure of receiving light incident through the rear surface of the housing or the electronic device, but such arrangement structure may also be utilized for the structure of placing the front camera (e.g., the camera module 105 of FIG. 1). As an example, embodiments of the disclosure may also be applied to other components (e.g., battery or audio module) that may be tilted while assembling the electronic device or using the electronic device, among the components that may be disposed inside the housing, as well as the camera module. Other various embodiments are possible as well.

What is claimed is:

1. An electronic device comprising:
    a printed circuit board;
    at least one electrical and/or optical component electrically connected with the printed circuit board;
    a housing accommodating the printed circuit board and the at least one component; and
    a supporting structure including a cantilever-shaped extension extending toward an interfacing area of the at least one component and configured to support at least a portion of the at least one component,
    wherein the cantilever-shaped extension includes a first portion extending from the housing in a first direction toward the interfacing area of the at least one component and a second portion configured for contacting the at least one component and extending in a second direction different from the first direction,
    wherein the second portion is configured to be displaced relative to the first portion and toward the at least one component by a displacement amount, and wherein the displacement amount corresponds to a dimensional tolerance of the at least one component, and
    wherein the cantilever-shaped extension is configured to apply a load to the at least one component that exceeds an elastic force generated by the at least one component without exceeding a breaking strength of the at least one component.

2. The electronic device of claim 1, wherein the supporting structure includes a supporting member disposed inside the housing.

3. The electronic device of claim 1, wherein the supporting structure includes a decoration member forming a portion of an exterior of the housing.

4. The electronic device of claim 3, wherein the decoration member is coupled with a supporting member disposed inside the housing.

5. The electronic device of claim 1, wherein the at least one component includes a camera module.

6. The electronic device of claim 5, wherein the camera module includes;
    a lens assembly,
    a camera housing surrounding at least a portion of the lens assembly, and
    wherein the cantilever-shaped extension is configured to support an edge of the camera housing.

7. The electronic device of claim 1, wherein the supporting structure includes an opening configured to interface the at least one component.

8. The electronic device of claim 7, wherein at least a portion of the cantilever-shaped extension extends toward a center of the opening.

9. The electronic device of claim 1, wherein the extension includes a plurality of cantilever-shaped extensions.

10. The electronic device of claim 9, wherein the plurality of cantilever-shaped extensions are radially disposed around the interfacing area.

11. The electronic device of claim 9, wherein the plurality of cantilever-shaped extensions are disposed at equal intervals around the interfacing area.

12. The electronic device of claim 9, wherein at least two of the plurality of cantilever-shaped extensions are connected to each other to form a bridge.

13. The electronic device of claim 9, wherein the at least one component is connected with the printed circuit board through a flexible printed circuit board extending in a direction, and
   wherein an extension disposed in the direction in which the flexible printed circuit board extends among the plurality of extensions has a greater elastic force than another extension.

14. An electronic device including a camera module, comprising:
   a printed circuit board;
   a camera module including a lens assembly and a camera housing at least partially surrounding at least a portion of the lens assembly and electrically connected with the printed circuit board;
   a housing accommodating the printed circuit board and the camera module and a sensing area of the camera module; and
   a supporting structure including a cantilever-shaped extension extending toward the sensing area of the camera module and configured to support at least a portion of the camera housing,
   wherein the cantilever-shaped extension includes a first portion extending from the housing in a first direction toward the sensing area of the camera module and a second portion configured for contacting the camera housing and extending in a second direction different from the first direction,
   wherein the second portion is configured to be displaced relative to the first portion and toward the camera module by a displacement amount, and wherein the displacement amount corresponds to a dimensional tolerance of the camera module, and
   wherein the second portion is configured to be positioned offset from the first portion by an amount that maintains a negative tolerance to allow a predetermined load to be continuously applied to the camera module.

15. The electronic device of claim 14, wherein the supporting structure includes a supporting member disposed inside the housing.

16. The electronic device of claim 14, wherein the supporting structure includes a decoration member forming a portion of an exterior of the housing.

* * * * *